(12) United States Patent
Terada et al.

(10) Patent No.: US 6,250,174 B1
(45) Date of Patent: Jun. 26, 2001

(54) ROBOT CONSTRUCTION

(75) Inventors: Akihiro Terada; Hikaru Yamashiro, both of Fujiyoshida (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/117,397

(22) PCT Filed: Dec. 17, 1997

(86) PCT No.: PCT/JP97/04656

§ 371 Date: Jul. 29, 1998

§ 102(e) Date: Jul. 29, 1998

(87) PCT Pub. No.: WO98/26906

PCT Pub. Date: Jun. 25, 1998

(30) Foreign Application Priority Data

Dec. 17, 1996 (JP) .................................................. 8-353284

(51) Int. Cl.$^7$ .................................................. B25J 17/00
(52) U.S. Cl. ........................................ 74/490.02; 414/918
(58) Field of Search ................................. 414/918, 729; 74/490.02, 490.03; 901/15, 19, 25, 26

(56) References Cited

U.S. PATENT DOCUMENTS

| 5,006,035 | * | 4/1991 | Nakashima et al. | ............... | 901/15 X |
|---|---|---|---|---|---|
| 5,115,690 | | 5/1992 | Torii et al. . | | |
| 5,293,107 | | 3/1994 | Akeel . | | |
| 5,606,235 | * | 2/1997 | Mauletti | ............... | 901/25 X |

FOREIGN PATENT DOCUMENTS

| 0 658 405 | 6/1995 | (EP) . |
|---|---|---|
| 60-44288 | 3/1985 | (JP) . |
| 61-187691 | 11/1986 | (JP) . |
| 2-198781 | 8/1990 | (JP) . |
| 5-318378 | 12/1993 | (JP) . |
| 6-315879 | 11/1994 | (JP) . |

* cited by examiner

Primary Examiner—David A. Bucci
Assistant Examiner—Colby Hansen
(74) Attorney, Agent, or Firm—Staas & Halsey LLP

(57) ABSTRACT

A robot 1A comprises a robot stationary base 1, a first speed reducer mechanism attachment base 11 to which a first axis speed reducer mechanism 12 and a second axis speed reducer mechanism 21 are attached, a first arm AM1, a second speed reducer mechanism attachment base 35 to which a third axis speed reducer mechanism 31 and a fourth axis speed reducer mechanism 41 are attached, and a second arm AM2. An electric cable (CB) or a pipeline passes from the robot stationary base 1 through a hollow part in the first axis speed reducer mechanism 12, and from there passes around the outside of the second axis speed reducer mechanism 21, extending along the first arm AM1.

8 Claims, 3 Drawing Sheets

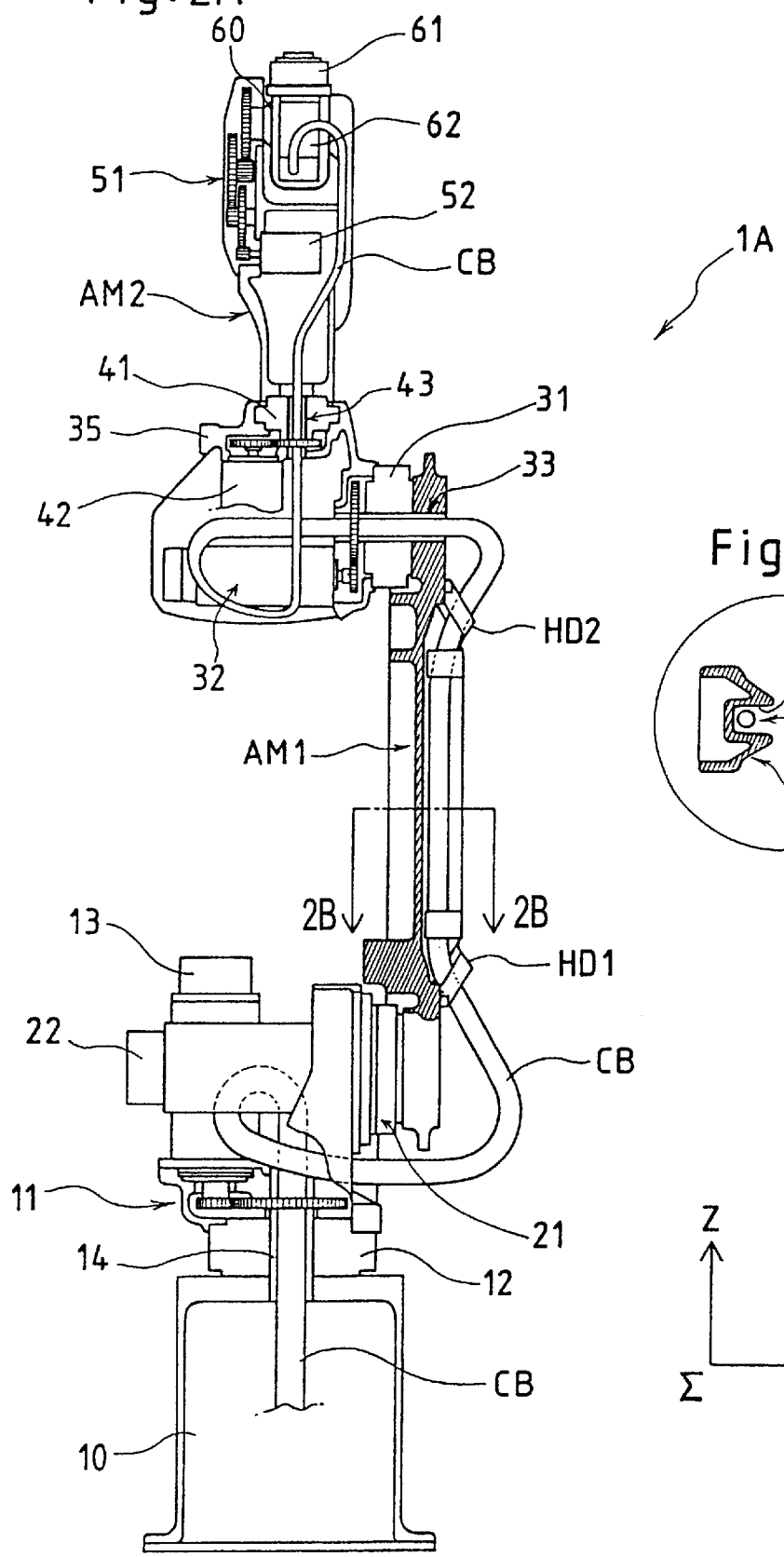

ROBOT CONSTRUCTION

BACKGROUND OF THE INVENTION

1. Field of the Invention

This invention relates to the structure of an improved industrial robot associated with cables used for supplying electric power or transmitting electrical signals, and with ducts and other pipelines used for conveying air, coolants, or other fluids.

2. Description of the Related Art

In general, industrial robots (hereinafter referred to as robots) are equipped with motors to drive the robot axis, electrical cables for supplying electric power to or sending and receiving electrical signals to and from machining tools and, small cameras mounted on the robots, and ducts or other pipelines for conveying air, coolants, or other fluids.

As robots ordinarily move in conjunction with such actions as turning, extending, or retracting, in installing the cables and ducts (hereinafter both cables and ducts are referred to as "cable(s)"), care must be taken so that the installed cables do not inhibit robot movement, and so that the cables are not subjected to excessive tension, twisting, or tangling by the movement of the robot. In particular, when the range of a robot's turning movement is made large (360° for example), cables tend to get wrapped up and damaged by excessive tension. In many cases, therefore, it becomes inevitable to limit the range of a robot's turning movement with reluctance.

In order to avoid such limitations, there is a known technique with which through-holes are opened in the centers of the speed reducers with which the drive units of robot axis are equipped, and cables are run through those through-holes (see Japanese Patent Application, Laid-Open H7-108485).

When such a cable installation technique is employed in each robot axis, one naturally would expect that cable interference with robot axis movements, particularly with turning movements, would be reduced, and that limitations on the range of movement of robot axis, particularly the range of turning movement, would be greatly relaxed.

There is a problem, however, in that the structure of the speed reducer mechanism where through-holes are provided in the center becomes complex because of the unavoidable necessity of providing a bearing mechanism for mechanical input and output at the periphery thereof, away from the center thereof. For this reason, if such a bearing mechanism is employed in all of the robot axes in order to avoid cable interference when the robot axis make a turning movement, the entire structure becomes complex, and the overall cost rises.

SUMMARY OF THE INVENTION

An object of the present invention is to provide a robot structure wherewith overall robot costs can be kept from escalating, while retaining the advantages of the cable installation technique noted above using a hollow structure as described above.

In order to achieve the above object, the robot structure according to the present invention comprises: a robot stationary base; a first speed reducer mechanism attachment base that is attached to said robot stationary base and to which is attached a first axis speed reducer mechanism and a second axis speed reducer mechanism linked to one end of a first arm; and cables and/or pipelines from said robot stationary base; wherein a hollow part is formed in the center of said first speed reducer mechanism for passing said cables and/or pipelines from said robot stationary base; and said cables and/or pipelines coming out from said hollow part are installed so as to wind around the outside of said second speed reducer mechanism and, after arriving in the vicinity of said one end of said first arm, follow said first arm and extend in the direction of the other end of said first arm.

Preferably, on one side surface of the first arm, a channel of sufficient width and depth to accommodate the cables and/or pipelines is formed longitudinally in the arm.

Preferably, also, in the vicinity of the one end and the other end of the arm, on the side thereof where the channel is formed, fasteners are attached for holding the cables and/or pipelines inside the channel.

According to the robot structure of the present invention, overall robot costs can be kept from escalating while exploiting the advantage of the cable installation technique using speed reducers having a hollow structure, that is, that the pipelines and the robot turning movements do not interfere with one another.

BRIEF DESCRIPTION OF THE DRAWINGS

FIG. 2A roughly corresponds to a view of the robot in FIG. 1 as seen from the direction of the arrow A in FIG. 1, representing a first embodiment of the present invention;

FIG. 2B is an enlarged view of the 2B—2B cross-section of FIG. 2A;

DESCRIPTION OF THE PREFERRED EMBODIMENTS (General Description of Robots)

Figure 1:
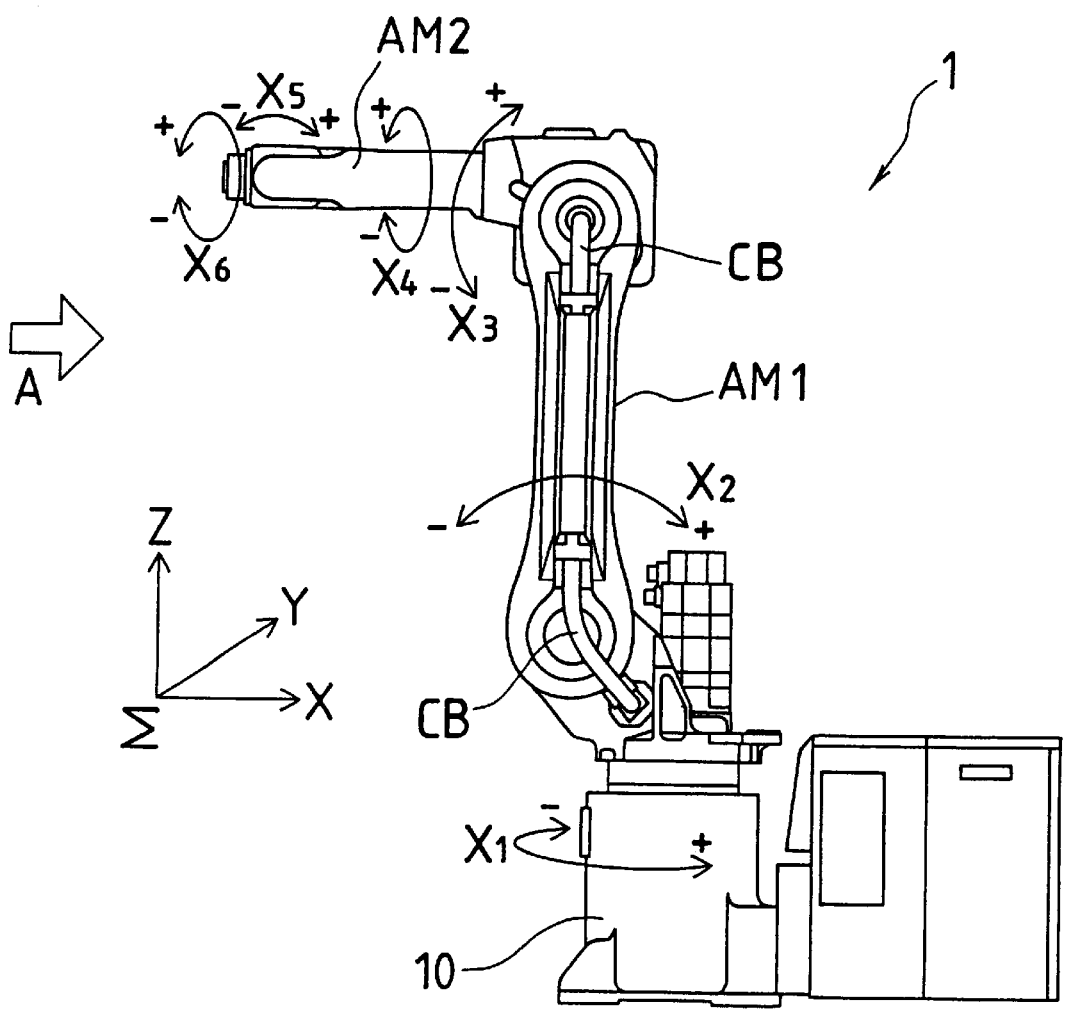
FIG. 1 is a figure for roughly describing the robot structure to which the present invention pertains.

A general description of the robot structure according to the present invention is given first, with reference to FIG. 1.

The robot 1 illustrated in FIG. 1 is a six-axis upright articulated robot including a first axis X1, a second axis X2, . . . , and a sixth axis X6, in order from the direction of a robot stationary base 10. All of these axes are turning axes which turn in the directions indicated by the arrows.

The second axis X2 directly drives a first arm AM1, and the fourth axis X4 directly drives a second arm AM2. The mechanisms for the fifth axis X5 and sixth axis X6 are positioned in FIG. 1 such as to be hidden behind the ends of the second arm AM2. In FIG. 1, moreover, only a portion of a cable CB (that is, the portion extending along the first arm AM1) is visible. This cable CB, as explained earlier, may be a cable for providing electric power to the motors that drive the robot axis, to the drives of machining tools carried by the robot, or to small cameras, or a cable for transmitting electrical signals. It may also be a duct for supplying air, coolant, or other fluid.

It is assumed here, for the purpose of indicating axis turning directions of axis of the robot 1 illustrated in FIG. 1, that the robot 1A is in a three-axis rectangular coordinate system Σ. Based on this coordinate system Σ, the stationary base 10 is installed on the XY plane, standing upright in the direction of the Z axis, and the first axis X1 turns about an axis that is parallel to the Z axis. Now, in the robot 1 in the state illustrated in FIG. 1, the second axis X2 turns about an axis parallel to the Y axis, the third axis X3 turns about an axis parallel to the Y axis, the fourth axis X4 turns about an axis parallel to the X axis, the fifth axis X5 turns about an axis parallel to the Y axis, and the sixth axis X6 turns about an axis parallel to the X axis.

(A First Embodiment)

A first embodiment of the present invention is next described with reference to FIGS. 2A and 2B.

FIG. 2A is a view of the robot 1A as seen from the direction of the arrow A in FIG. 1. That is, if FIG. 1 is taken as a side elevation, then FIG. 2A becomes a front elevation. In FIG. 2A, however, the second arm AM2 is at a more open attitude relative to the first arm AM1 than it is in FIG. 1.

A first axis speed reducer mechanism 12 coupled with the output shaft of a first axis drive motor 13 is attached to the robot stationary base 10. This first axis speed reducer mechanism 12 is mounted on a first speed reducer mechanism attachment base (attachment housing) 11, and on this first speed reducer mechanism attachment base 11 is mounted a second axis speed reducer mechanism 21. The first axis speed reducer mechanism 12 has a hollow part 14 formed in the center thereof through which the cable CB can be passed.

The base end of the first arm AM1 is coupled to the second axis speed reducer mechanism 21. This first arm AM1 is driven by a second axis drive motor 22 so that it turns. At the distal end of the first arm AM1 a second speed reducer mechanism attachment base (attachment housing) 35 is linked through a third axis speed reducer mechanism 31. On this second speed reducer mechanism attachment base 35 are mounted a third axis speed reducer mechanism 31 and a fourth axis speed reducer mechanism 41. The third axis speed reducer mechanism 31 is linked to the output shaft of a third axis drive motor 32, and the fourth axis speed reducer mechanism 41 is linked to the output shaft of a fourth axis drive motor 42. The third and fourth axis speed reducer mechanisms 31 and 41 have hollow parts 33 and 43 formed in the centers thereof, respectively, through which the cable CB can be passed.

The base end of the second arm AM2 is coupled to the fourth axis speed reducer mechanism 41 mounted on the second speed reducer mechanism attachment base 35. A fifth axis drive motor 52 is located inside the second arm AM2. The output shaft of this fifth axis drive motor 52 is linked with a fifth axis speed reducer mechanism 51 positioned on the side of the second arm AM2.

A third speed reducer mechanism attachment base (attachment housing) 60 is attached to the distal end of the second arm AM2. This third speed reducer mechanism attachment base 60 has a sixth axis speed reducer mechanism 61 mounted on it. This sixth axis speed reducer mechanism 61 is linked to the output shaft of a sixth axis drive motor 62.

The cable CB extends from the interior of the robot stationary base 10 to the exterior. This cable CB passes through the hollow part 14 in the first speed reducer mechanism 12, passes through the first speed reducer mechanism attachment base 11 and exits to the outside thereof, winds around the outside of the second speed reducer mechanism 21, and from there extends along the first arm AM1.

The first arm AM1 has a concavity GR formed in it, extending longitudinally along one side of the arm AM1, as seen in the cross-section thereof in FIG. 2B. The cable CB is accommodated in this concavity GR. Also, fasteners HD1 and HD2 are attached to the one end of the first arm AM1 (i.e. the end linked to the second speed reducer mechanism 21) and to the other end, respectively, for the purpose of holding the cable CB inside the concavity GR so that it does not jump out of the cavity GR.

The cable CB that passes out from the concavity GR of the first arm AM1 passes through the hollow part 33 in the third axis speed reducer mechanism 31 and enters the interior of the second speed reducer mechanism attachment base 35. The cable CB then changes direction inside the speed reducer mechanism attachment base 35 and passes through and out from the hollow part 43 in the fourth axis speed reducer mechanism 41.

After passing out from the hollow part 43 in the fourth axis speed reducer mechanism 41, the cable CB extends along one side of the second arm AM2 (that is, the side opposite that on which the fifth axis speed reducer mechanism 51 is positioned).

As described in the foregoing, in the robot 1A in FIG. 2A, the cable CB is made to pass through the hollow part 14 in the first axis speed reducer mechanism 12, through the hollow part 33 in the third axis speed reducer mechanism 31, and through the hollow part 43 in the fourth axis speed reducer mechanism 41. Therefore, when the first axis drive motor 13, the third axis drive motor 32, and the fourth axis drive motor 42 are activated to turn the members associated with these axis, clearly there will be no problem such as the cable CB becoming entangled therein.

In this embodiment, as described in the foregoing, no particular provision is made for the formation of a hollow part in the center of the second axis speed reducer mechanism 21 or for passing the cable CB therethrough. That is, as illustrated in FIG. 2A, the cable CB is made to wrap around the outside of the second speed reducer mechanism 21. Even when the cable CB is deployed in this manner, however, and the second axis drive motor 22 is activated so as to turn the member (i.e. the first arm AM1) associated with the axis thereof, there is no danger of the cable CB becoming entangled therein.

(A Second Embodiment)

A second embodiment of the present invention is described next, making reference to FIGS. 3A and 3B.

Figure 3A:
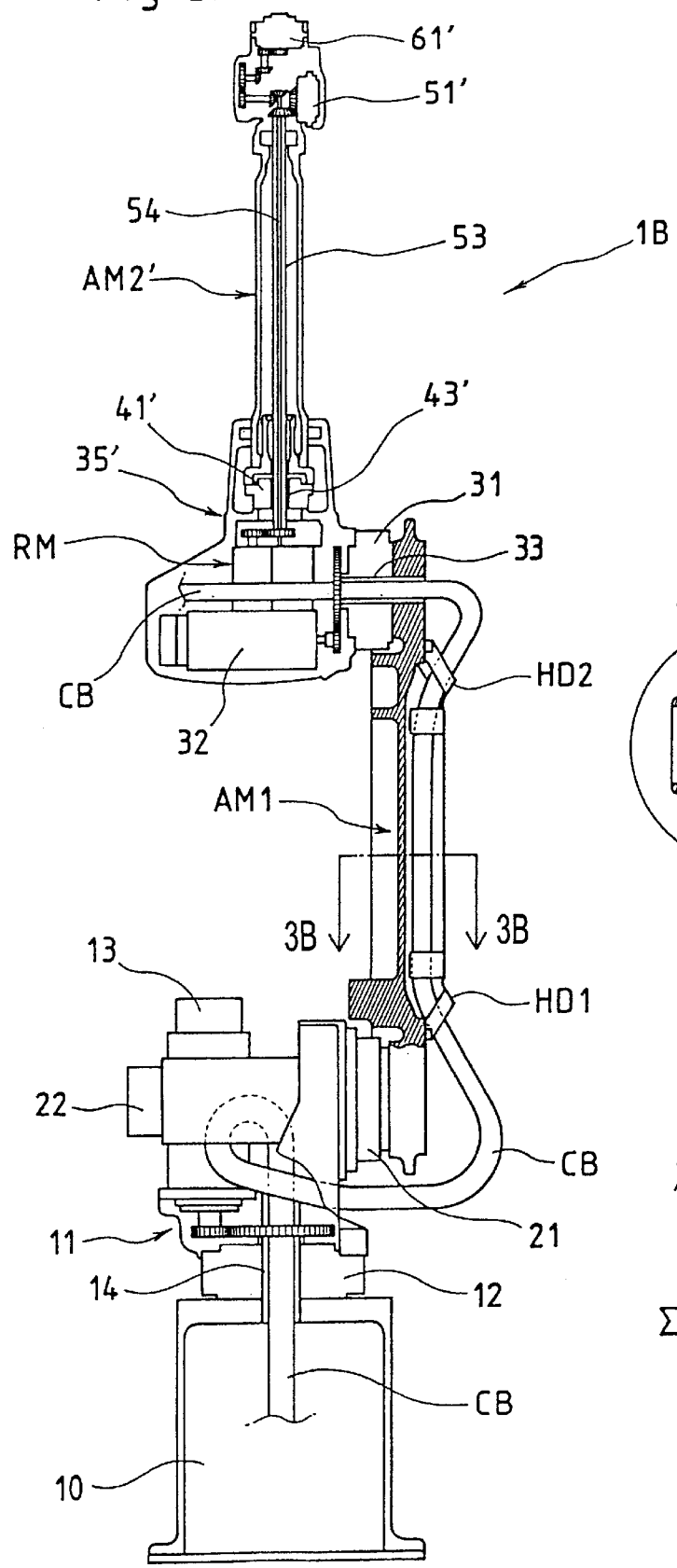
FIG. 3A roughly corresponds to a view of the robot in FIG. 1 as seen from the direction of the arrow A in FIG. 1, representing a second embodiment of the present invention.
Figure 3B:
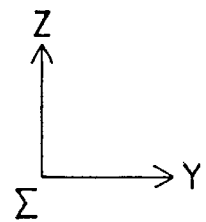
FIG. 3B is an enlarged view of the 3B—3B cross-section of FIG. 3A.

FIG. 3A, as FIG. 2A, is a view of the robot 1 illustrated in FIG. 1 as seen from the direction of the arrow A in FIG. 1. In the robot 1B illustrated in FIG. 3A, the parts associated with the first axis, second axis, and third axis have substantially the same structure as the parts associated with the first axis, second axis, and third axis in the robot 1A according to the first embodiment. Furthermore, the path of the cable CB from the point where it exits from the interior of the stationary base 10 until the point where it passes out of the hollow part 33 in the third axis speed reducer mechanism 31 is substantially the same as in the first embodiment as illustrated in FIGS. 2A and 2B.

This being so, only those parts that differ from the first embodiment are described in the following.

A second speed reducer mechanism attachment base (attachment housing) 35' is linked through the third speed reducer mechanism 31 to the distal end of the first arm AM1. On this second speed reducer mechanism attachment base 35' are mounted both the third axis speed reducer mechanism 31 and a fourth axis speed reducer mechanism 41'. On this second speed reducer mechanism attachment base 35' are mounted not only the third axis drive motor 32 and fourth axis drive motor, but also the fifth axis drive motor and sixth axis drive motor. In FIG. 3A, the fourth axis drive motor, fifth axis drive motor, and sixth axis drive motor are installed in a group and indicated by the common reference symbol RM.

The base end of a second arm AM2' is coupled to the fourth axis speed reducer mechanism 41' mounted on the second speed reducer mechanism attachment base 35'. Meanwhile, a fifth axis speed reducer mechanism 51' is attached near the distal end of the second arm AM2', and a sixth axis speed reducer mechanism 61' is attached to the surface of the distal end of the second arm AM2'. Also, the fifth axis speed reducer mechanism 51' and the fifth axis drive motor are linked with a driving shaft 53, while the sixth axis speed reducer mechanism 61' and the sixth axis drive motor are linked with the driving shaft 54. These driving shafts 53 and 54 pass through the hollow part 43 formed in the center of the fourth axis speed reducer mechanism 41' and extend along the side of the second arm AM2'.

Accordingly, these motors, that is, fourth axis drive motor, fifth axis drive motor and sixth axis drive motor, can be considered to be a three-axis drive motor RM constituting a wrist of the robot. These three drive motors, moreover, are mounted together on the second speed reducer mechanism attachment base 35', as described above, wherefore the cable CB that supplies electric power to the axis drive motors terminates at the position where the drive motor RM is installed.

In this embodiment also, as in the first embodiment, even though no hollow part is formed in the center of the second axis speed reducer mechanism 21 for passing the cable CB, there is no danger of the cable CB becoming entangled when the member associated with the second axis (i.e. the first arm AM1) turns.

What is claimed is:

1. A robot, comprising:
    a robot stationary base;
    at least one of a cable and a pipeline extending from said robot stationary base;
    a first speed reducer mechanism attachment base attached to said robot stationary base;
    a first axis speed reducer mechanism mounted on the first speed reducer mechanism attachment base, said first axis speed reducer mechanism including a hollow part formed in a center thereof to pass said at least one of the cable and the pipeline from the stationary base; and
    a second axis speed reducer mechanism mounted on the first speed reducer mechanism attachment base, and linked to one end of a first arm, wherein said second axis speed reducer mechanism does not include a hollow portion to pass said at least one of the cable and the pipeline,
    wherein said at least one of the cable and the pipeline pass through and extend from said hollow part of said first axis speed reducer mechanism, wind around the outside of said second axis speed reducer mechanism without passing through a portion thereof and, after arriving in the vicinity of said one end of said first arm, follow said first arm and extend in a direction of an other end of said first arm.

2. The robot according to claim 1, wherein a channel of sufficient width and depth to accommodate said at least one of the cable and the pipeline is formed longitudinally in one side surface of said first arm.

3. The robot structure according to claim 1, further comprising fasteners respectively attached in the vicinity of said one end of said first arm and in the vicinity of the other end of said first arm, on the side of said first arm where said channel is formed to hold said at least one of the cable and the pipeline inside said channel.

4. The robot structure according to claim 1, further comprising:
    a second speed reducer mechanism attachment base linked to the other end of said first arm; and
    a third axis speed reducer mechanism attached to the second speed reducer mechanism attachment base,
    wherein a hollow part is formed in the center of said third axis speed reducer mechanism, and
    said at least one of the cable and the pipeline pass through said hollow part, along said first arm.

5. The robot structure according to claim 4, further comprising a fourth axis speed reducer mechanism linked to said second speed reducer mechanism attachment base,
    wherein a hollow part is formed in the center of said fourth axis speed reducer mechanism, and
    at least one of the cable and the pipeline pass through said hollow part in said third axis speed reducer mechanism.

6. The robot structure according to claim 5, further comprising a second arm having one end linked to said fourth axis speed reducer mechanism; and
    a fifth axis speed reducer mechanism positioned on one side of said second arm,
    wherein said at least one of the cable and the pipeline that pass through the hollow part in said third axis speed reducer mechanism are placed on the other side thereof.

7. The robot structure according to claim 6, further comprising:
    a third speed reducer mechanism attachment base linked to an other end of said second arm; and
    a sixth axis speed reducer mechanism attached to said third speed reducer mechanism attachment base.

8. The robot structure according to claim 4, further comprising:
    a fourth axis speed reducer mechanism having a hollow part formed in the center thereof and linked to said second speed reducer mechanism attachment base;
    a second arm linked to said fourth axis speed reducer mechanism;
    a fifth axis speed reducer mechanism positioned on one side of said second arm;
    a sixth axis speed reducer mechanism positioned on a surface of a distal end of the second arm;
    a fourth axis drive motor, a fifth axis drive motor, and a sixth axis drive motor mounted on said second speed reducer mechanism attachment base;
    a first driving shaft linking said fifth axis drive motor and said fifth axis speed reducer mechanism; and
    a second driving shaft linking said sixth axis drive motor and said sixth axis speed reducer mechanism, respectively, passed through a hollow part in said fourth axis speed reducer mechanism.

* * * * *